United States Patent
Beck et al.

(10) Patent No.: US 6,842,611 B2
(45) Date of Patent: Jan. 11, 2005

(54) RECEIVED DATA PROCESSING METHOD IN COMMUNICATION DEVICE FOR SUPPORTING BLUETOOTH WIRELESS COMMUNICATION

(75) Inventors: Chang-kyu Beck, Seoul (KR); Ji-hyun Lim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 525 days.

(21) Appl. No.: 09/808,413

(22) Filed: Mar. 15, 2001

(65) Prior Publication Data

US 2001/0049276 A1 Dec. 6, 2001

(30) Foreign Application Priority Data

Apr. 6, 2000 (KR) ........................................ 2000-17902

(51) Int. Cl.$^7$ ................................................ H04B 5/00
(52) U.S. Cl. .................... 455/414.1; 455/41.2; 455/557
(58) Field of Search .......................... 455/39, 557, 463, 455/556.1, 556.2, 414.1, 414.2; 370/912

(56) References Cited

U.S. PATENT DOCUMENTS

| | | | |
|---|---|---|---|
| 5,247,617 A | 9/1993 | Olson ........................ 395/250 |
| 6,255,800 B1 * | 7/2001 | Bork .......................... 320/115 |
| 6,463,034 B1 * | 10/2002 | Abrol et al. ................. 370/229 |
| 6,542,734 B1 * | 4/2003 | Abrol et al. ............. 455/412.1 |
| 6,603,977 B1 * | 8/2003 | Walsh et al. .................. 379/45 |
| 2001/0018329 A1 * | 8/2001 | Tada et al. ..................... 455/39 |
| 2003/0013411 A1 * | 1/2003 | Uchiyama .................... 455/40 |
| 2003/0038731 A1 * | 2/2003 | Sako et al. ............. 340/825.26 |
| 2003/0056196 A1 * | 3/2003 | Kim et al. ................... 717/124 |

OTHER PUBLICATIONS

"Host Controller Interface Functional Specification" Bluetooth Specification Version 1.0 B; Nov. 29, 1999; pp. 517–439, XP002174954.
"Host Controller Interface Functional Specification, paragraph: 5. Events"; Bluetooth Specification Version 1.0 B; Nov. 29, 1999; pp. 703–705, 737; XP002174956.
"HCI USB Transport Layer" Bluetooth Specification Version 1.0 B; Nov. 29, 1999; pp. 759–773; XP002174955.

* cited by examiner

Primary Examiner—CongVan Tran
(74) Attorney, Agent, or Firm—Sughrue Mion, PLLC

(57) ABSTRACT

A received data processing method in a wireless communication between devices that support a bluetooth wireless technology is provided. The method for processing data received through a wireless channel, in a communication device that supports bluetooth wireless communication, includes the steps of (a) a bluetooth module receiving data through a wireless channel, (b) the bluetooth module informing a bluetooth host that data received through a universal serial bus (USB) exists in the bluetooth module, and (c) the bluetooth host reading the data received by the bluetooth module in the step (a) through the USB when the bluetooth host is informed that received data exists in the step (b). According to the received data processing method, it is possible to prevent overhead from occurring due to unnecessary request for data by the bluetooth host generating request for data through the USB only when the received data exists in the bluetooth module. Accordingly, it is possible to minimize load of the bluetooth host and to improve data receipt bandwidth in a bluetooth host controller interface (HCI) universal serial bus (USB) transport layer. Also, the entire USB transmission speed is increased since request for data can be generated at the point of time at which data is received.

19 Claims, 3 Drawing Sheets

RECEIVED DATA PROCESSING METHOD IN COMMUNICATION DEVICE FOR SUPPORTING BLUETOOTH WIRELESS COMMUNICATION

BACKGROUND OF THE INVENTION

1. Field of the Invention

The present invention relates to wireless communication, and more particularly, to a method of processing received data in wireless communication between devices for supporting a bluetooth wireless technology. The present application is based on Korean Patent Application No. 00-17902, filed Apr. 6, 2000, which is incorporated herein by reference.

2. Description of the Related Art

A bluetooth wireless technology provided in order to remove connection cables that exist between various communication devices is an industrial standard for an ad-hoc network that is established between the various communication devices using a radio link in the 2.4 GHz band. Bluetooth wireless technology supports wireless communication at a relatively short distance between the various communication devices and provides a synchronous connection-oriented (SCO) link and an asynchronous connectionless (ACL) link.

Figure 1:
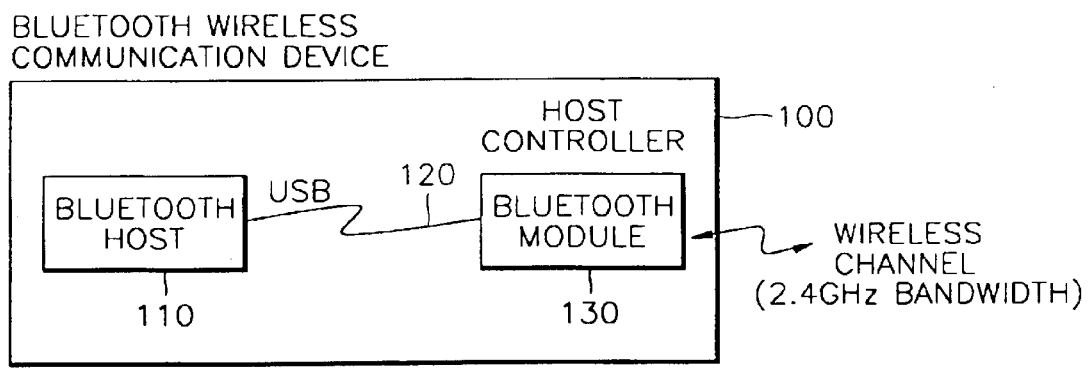

FIG. 1 schematically shows the structure of a bluetooth wireless communication device 100. As shown in FIG. 1, in a bluetooth specification, a portion that performs wireless communication with external devices is referred to as a bluetooth module 130 or a host controller. A portion that performs a function of processing data transferred and received through the bluetooth module 130 according to an application, that is, a function which is unique to a particular type of equipment, is referred to as a bluetooth host 110. Namely, the, bluetooth module 130 transfers data to and receives data from an external device through a wireless channel. The bluetooth host 110 transfers data received from the application to the bluetooth module 130, reads data received from the bluetooth module 130, and transfers the received data to the application.

Figure 2:
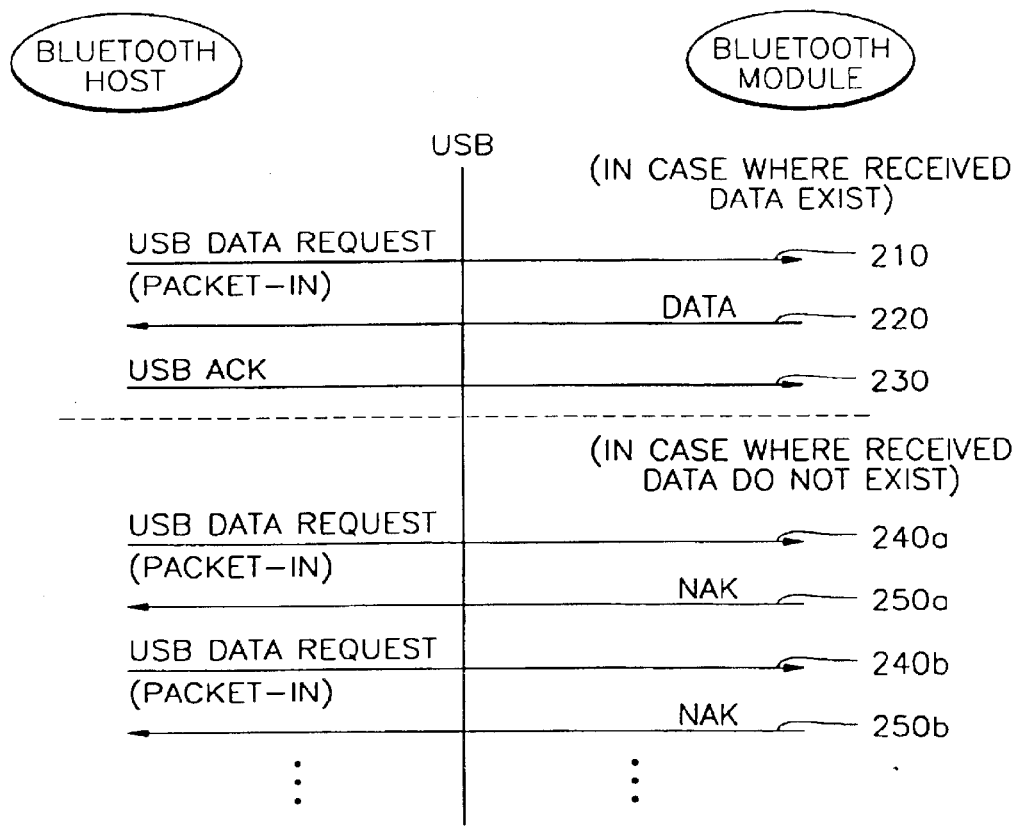

In the current bluetooth specification, a portion which defines an interface between the bluetooth host 110 and the bluetooth module 130 is called a host controller interface (HCI). In the HCI, a universal serial bus (USB) 120, a PC card, RS232, and a universal asynchronous receiver/transmitter (UART) can be used as a transport layer. FIG. 2 schematically illustrates a method of processing received data in the bluetooth HCI USB transport layer of a conventional bluetooth wireless communication device.

In the bluetooth HCI USB transport layer specification, when the bluetooth host wishes to receive data from the bluetooth module through the USB, the bluetooth host does not know whether data received from the outside through the wireless link exists in the bluetooth module. Also, according to the USB specification, the bluetooth module can transfer data to the bluetooth host only as a response to a request for data from the bluetooth host. Accordingly, the bluetooth host repeatedly requests for data by a polling method regardless of whether data received from the outside through the wireless link exists in the bluetooth module. Referring to FIG. 2, the method of processing the received data in the conventional bluetooth HCI USB transport layer will now be described.

When the bluetooth host wishes to receive data from the bluetooth module, the bluetooth host transfers an "In Packet" command (referred to as Packet-IN in FIG. 2), which is a request for data, to the bluetooth module through the USB (step 210). The types of request for data include a "Bulk-IN" request for the above-mentioned ACL link and an "Isochronous-IN" request for the SCO link.

When the data received from the outside through the wireless link exists in the bluetooth module, the bluetooth module transfers the received data to the bluetooth host through the USB (step 220) and the bluetooth host replies with a USB "ACK (Acknowledge)" with respect to the received data (step 230).

However, since the bluetooth host does not know whether data received from the outside through the wireless link exists in the bluetooth module, the bluetooth host may transfer a request for data to the bluetooth module through the USB even when no received data exists in the bluetooth module (step 240a). In this case, since no received data exists in the bluetooth module, the bluetooth module sends a "NAK (Nacknowledge)" to the bluetooth host through the USB (step 250a).

In this case, according to the current bluetooth HCI USB specification, the bluetooth host repeats a request for data until data is received from the bluetooth module (step 240b) and the bluetooth module continuously generates a "NAK" (step 250b).

Therefore, according to the current bluetooth specification, a request for data and "NAK" are repeated even when no data exists in the bluetooth module. Accordingly, an excessive overhead is generated. Namely, repeated requests for data (Bulk-IN or Isochronous-IN) from the bluetooth host use an excessive amount of bandwidth on the USB network. As a result, the total transmission speed through the entire USB is reduced and the processing speed of the bluetooth communication device is reduced.

SUMMARY OF THE INVENTION

To solve the above problems, it is an object of the present invention to provide a received data processing method in a communication device that supports bluetooth wireless communication, which is capable of preventing bandwidth from being wasted due to unnecessary requests for data by a bluetooth host generating requests for data through a universal serial bus only when received data exists in a bluetooth module.

It is another object of the present invention to provide a communication device for supporting bluetooth wireless communication using the above received data processing method.

It is another object of the present invention to provide computer readable recording media on which is recorded a computer executable program for executing the received data processing method.

Accordingly, to achieve the first object, according to an aspect of the invention, there is provided a method for processing data received through a wireless channel, in a communication device that supports bluetooth wireless communication, comprising the steps of (a) a bluetooth module receiving data through a wireless channel, (b) the bluetooth module informing a bluetooth host that data received through a universal serial bus (USB) exists in the bluetooth module, and (c) the bluetooth host reading the data received by the bluetooth module in the step (a) through the USB when the bluetooth host is informed that received data exists in the step (b).

In the step (b), the bluetooth module preferably informs the bluetooth host that received data exists in the bluetooth module when the bluetooth module receives from the bluetooth host a request for checking whether received data exists in the bluetooth module, in response to the request for checking whether the received data exists.

In the step (b), the request for checking whether received data exist is preferably performed using a request for interrupt, which is periodically transferred by the bluetooth host to the bluetooth module through the USB, and the informing is performed using an event packet.

The step (c) preferably comprises the steps of (c1) the bluetooth host requesting the data received in the step (a) to the bluetooth module through the USB when the bluetooth host is informed that received data exists in the step (b) through the event packet and (c2) the bluetooth module providing the data received in the step (a) to the bluetooth host through the USB when the bluetooth module receives the request for the received data in the step (c1).

The event packet preferably comprises a link type field as a parameter field, for indicating an asynchronous link or a synchronous link. In the step (c1), a request for synchronous or asynchronous data is preferably performed according to the value of the link type field in the event packet.

The event packet preferably comprises a data length field as a parameter field, for indicating the length of the data received in the step (a). In the step (c), the request for the received data in the step (c1) and the provision of the received data in the step (c2) are preferably repeated an appropriate number of times, with reference to the value of the data length field in the event packet.

According to another aspect of the present invention, there is provided a method for processing data received through a wireless channel in a bluetooth module of a communication device that supports bluetooth wireless communication, comprising the steps of (a) receiving from a bluetooth host through a universal serial bus (USB) a request for checking whether received data exists in a bluetooth module, (b) the bluetooth module informing the bluetooth host through the USB that received data exists when data received from the outside through a wireless channel exists in the bluetooth module, (c) receiving from the bluetooth host, which is informed in the step (b) that the received data exists, through the USB a request for the received data, and (d) the bluetooth module providing the data received from the outside through the wireless channel to the bluetooth host through the USB.

According to another aspect of the present invention, there is provided a method for processing data received through a wireless channel, in a bluetooth host of a communication device that supports bluetooth wireless communication, comprising the steps of (a) a bluetooth host transferring a request to a bluetooth module through a universal serial bus (USB), for checking whether data received from the outside through a wireless channel exists, (b) being informed by the bluetooth module through the USB that data received through the wireless channel exists when data received from the outside through the wireless channel exists in the bluetooth module, (c) requesting the received data to the bluetooth module through the USB when the bluetooth host is informed that received data exists in the step (b), and (d) receiving from the bluetooth module through the USB, the data received by the bluetooth module from the outside through the wireless channel.

To achieve the second object, according to an aspect of the present invention, there is provided a computer readable recording medium for recording a program which is executed in a computer for processing received data, in a bluetooth module of a communication device that supports bluetooth wireless communication, wherein the program comprises the steps of (a) receiving a request from a bluetooth host through a universal serial bus (USB), for checking whether received data exists in a bluetooth module, (b) informing the bluetooth host through the USB that received data exists when data received from the outside through a wireless channel exists in the bluetooth module, (c) receiving from the bluetooth host, which is informed that the received data exists in the step (b) through the USB a request for the received data, and (d) transferring the data received from the outside through the wireless channel to the bluetooth host through the USB.

According to another aspect of the present invention, there is provided a computer readable recording medium for recording a program which is executed in a computer for processing received data, in a bluetooth host of a communication device that supports a bluetooth wireless communication, wherein the program comprises the steps of (a) transferring a request to a bluetooth module through a universal serial bus (USB), for checking whether data received from the outside through a wireless channel exists in a bluetooth module, (b) being informed from the bluetooth module through the USB that data received through the wireless channel exists when data received from the outside through the wireless channel exists in the bluetooth module, (c) requesting the received data to the bluetooth module through the USB when the bluetooth host is informed that received data exists in the step (b), and (d) receiving from the bluetooth module through the USB, the data received by the bluetooth module from the outside through the wireless channel.

To achieve the third object, according to an aspect of the present invention, there is provided a communication apparatus for supporting bluetooth wireless communication, comprising a bluetooth module for transferring and receiving data through a wireless channel, a bluetooth host for transferring data received from an application to the bluetooth module, reading data received in the bluetooth module, and transferring the received data to the application, and a universal serial bus (USB) for connecting the bluetooth module and the bluetooth host. The bluetooth module informs the bluetooth host through the USB that received data exist, when data received through the wireless channel exists in the bluetooth module. The bluetooth host reads through the USB the data received in the bluetooth module when the bluetooth host is informed by the bluetooth module that received data exists.

The bluetooth module preferably informs that received data exists in the bluetooth module using an event packet in response to a request for interrupt which is periodically transferred by the bluetooth host to the bluetooth module through the USB, when data received through the wireless channel exists in the bluetooth module.

The event packet preferably comprises a link type field as a parameter field for indicating an asynchronous link or a synchronous link and a data length field as a parameter field for indicating the length of the data received from the outside through the wireless channel.

BRIEF DESCRIPTION OF THE DRAWING(S)

Figure 3:
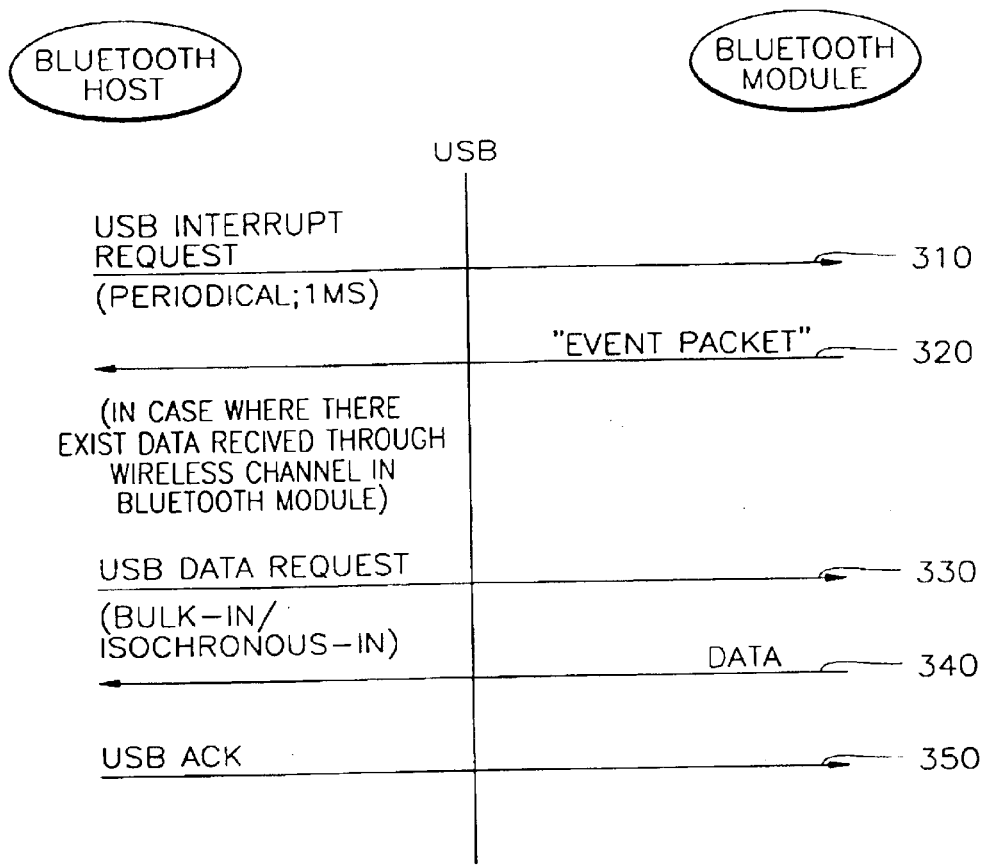
Figure 4:
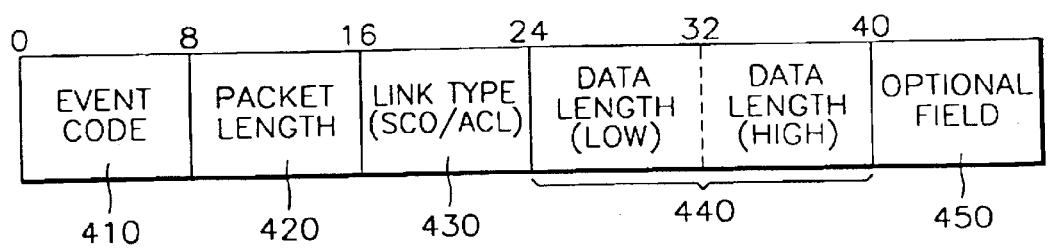
Figure 5:
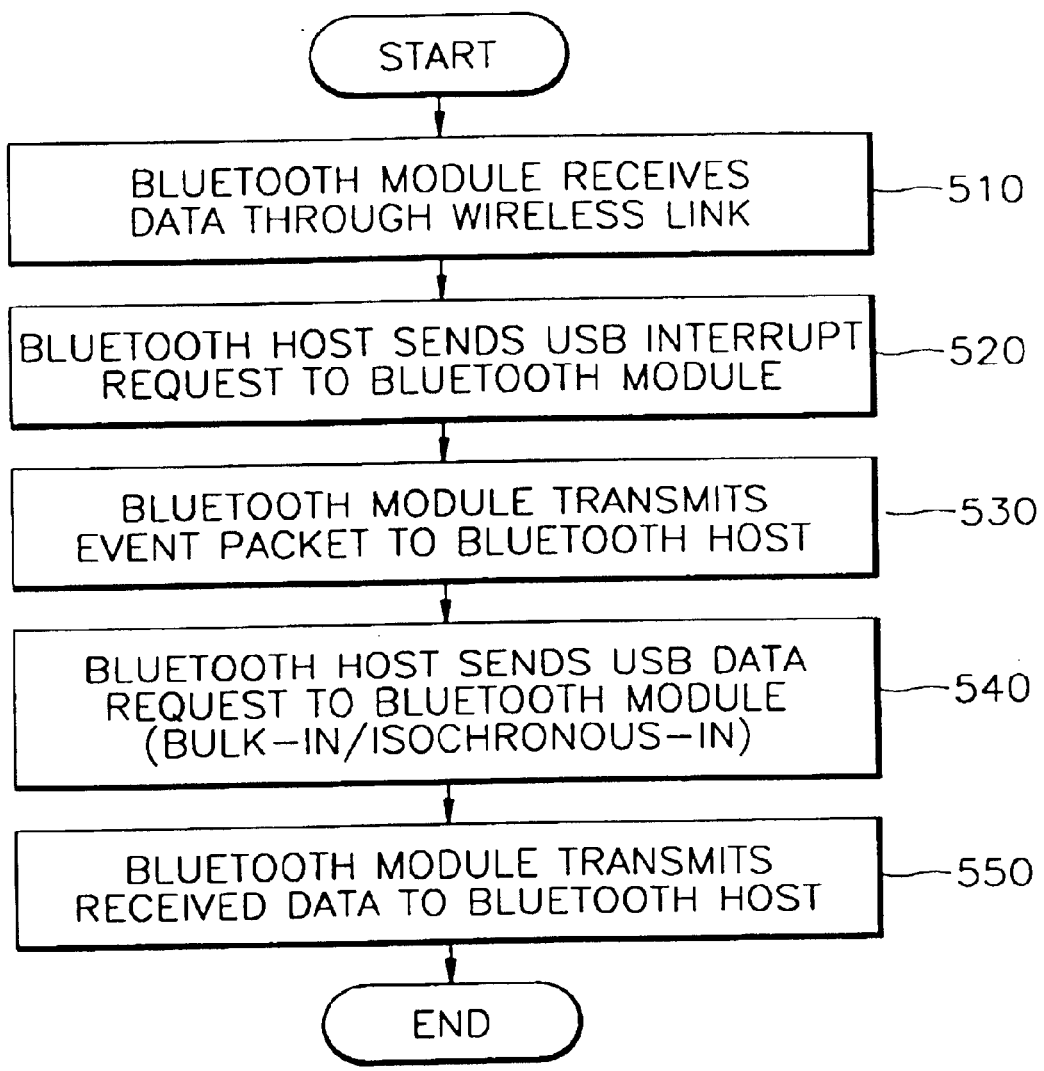

The above objects and advantages of the present invention will become more apparent by describing in detail a preferred embodiment thereof with reference to the attached drawings in which:

FIG. 1 schematically shows the structure of a bluetooth wireless communication apparatus;

FIG. 2 schematically illustrates a received data processing method used in a conventional bluetooth wireless communication apparatus;

FIG. 3 schematically illustrates a received data processing method used in a bluetooth wireless communication device according to an embodiment of the present invention;

FIG. 4 schematically shows an example of the structure of an event packet used for informing that data received through a wireless channel exists in the bluetooth wireless communication device according to the embodiment of the present invention; and FIG. 5 is a flowchart for illustrating the received data processing method according to the temporal order used in the bluetooth wireless communication apparatus according to the embodiment of the present invention.

DESCRIPTION OF THE PREFERRED EMBODIMENT(S)

Hereinafter, preferred embodiments of the structure and operation of the present invention will be described in detail with reference to the attached drawings.

FIG. 3 schematically shows a received data processing method used in a bluetooth wireless communication apparatus according to an embodiment of the present invention.

The present invention relates to a bluetooth wireless technology for defining a cableless connection between various types of equipment. Devices that can be connected to each other using the bluetooth technology include desktop/notebook computers, mobile communication terminals, and other portable communication equipments. Bluetooth wireless technology can be used for connecting various types of computer peripheral equipment, such as printers, scanners, monitors, keyboards, and mice, to computers through a wireless link. Hereinafter, a device or equipment for supporting bluetooth wireless communication (mounted with a bluetooth module) will be referred to as a bluetooth communication device or simply a communication device.

The present invention relates to a host controller interface (HCI) transport layer in the bluetooth wireless technology, and in particular, to a received data processing method in a universal serial bus (USB) transport layer. As mentioned previously, the HCI is a portion for defining an interface between a bluetooth host and a bluetooth module.

The present invention is provided for preventing USB bandwidth from being wasted due to unnecessary repetition of requests for USB data and "NAKs" even when no data received from the outside through the wireless link exists in the bluetooth module. The present invention provides a method by which the bluetooth host generates a request for data through the USB only when received data exists in the bluetooth module. Therefore, according to the embodiment of the present invention, since the bluetooth host only requests USB data when it is informed that data is received in the bluetooth module, unnecessary requests for USB data and unnecessary "NAKs" are not generated.

The embodiment of the present invention operates such that, when the bluetooth module receives data from external equipment through the wireless link, the bluetooth module informs the bluetooth host that data has been received from the external equipment and the bluetooth host generates a request for data (Bulk-IN or Isochronous-IN) only when the bluetooth host is informed by the bluetooth module that received data exists. In the embodiment of the present invention, an event packet is used by the bluetooth module to inform the bluetooth host that received data exists in the bluetooth module. The structure of the event packet will be defined. Here, the event packet is provided in response to request for USB interrupt, which is periodically transferred from the bluetooth host to the bluetooth module. The operation of the embodiment of the present invention will now be described with reference to FIG. 3.

The bluetooth host periodically transfers a request for the USB interrupt to the bluetooth module (step 310). Currently, the bluetooth specification defines the period of request for interrupt to be 1 ms. When the bluetooth module receives the request for the USB interrupt, it returns information on its state (step 320). The steps 310 and 320 are periodically repeated in the process of processing the received data in the conventional HCI USB transport layer, which is shown in FIG. 2. The present invention is based on the fact that the steps 310 and 320 can be used for informing the bluetooth host that received data exists in the bluetooth module.

In the embodiment of the present invention, when data received from the outside through the wireless link exists, the bluetooth module sends the event packet having the structure defined in the embodiment of the present invention (shown in FIG. 4; hereinafter referred to as an "R event packet") to the bluetooth host in the step 320. In the USB network, a request for interrupt uses a much smaller bandwidth than a request for data.

The structure of "the R event packet" according to the embodiment of the present invention will be described with reference to FIG. 4. FIG. 4 schematically shows an example of the structure of the event packet used for informing that data received through the wireless channel exists in the bluetooth wireless communication device according to the embodiment of the present invention.

As shown in FIG. 4, "the R event packet" is of a type common to all event packets and consists of an event code field (8 bits) 410, a packet length field (8 bits) 420, and parameter fields 430, 440, and 450.

The value of the event code field 410 is designated to be a predetermined value in order to show that the event packet is "the R event packet" according to the embodiment of the present invention. For example, a specific code value can be used among 0x21 through 0xff, which are reserved in the current bluetooth specification. The packet length field 420 displays the entire length in bytes of the parameter fields.

The parameter fields in "the R event packet" includes a link type field 430 and a data length field 440 and can selectively include an optional field.

The link type field 430 indicates the type of wireless link. The value of the link type field 430 can be used to determine the type of request for data in the step 330, which will be described hereinafter. For example, when a synchronous connection-oriented (SCO) link is used, the value of the link type field can be set to be 0. When an asynchronous connectionless (ACL) link is used, the value of the link type field can be set to be 1. In FIG. 4, the length of the link type field 430 is shown as 8 bits for the sake of convenience. However, the length of the link type field does not necessarily need to be 8 bits.

The data length field 440 indicates the length in bytes of the data that is received through the wireless channel and exists in the bluetooth module. The length in bytes of the received data can be utilized to determine the number of times that steps 330 through 350 must be repeated. In FIG. 4, the length of the data length field 440 is shown as 16 bits for the sake of convenience. However, the length of the data length field 440 does not necessarily need to be 16 bits. Also, it is apparent to anyone skilled in the art that the link type field 430 and the data length field 440 do not have to be arranged in the order shown in FIG. 4.

The optional field 450 can be used for optionally defining an additional function and can be excluded from "the R event packet". An example of the structure of "the R event packet" has been described. This structure can be changed, if necessary. The next step of FIG. 3 will now be described.

When the bluetooth host receives "the R event packet", the bluetooth host senses that data received from the outside through the wireless link exists in the bluetooth module and transfers a request for USB data to the bluetooth module (step 330). It is preferable that a request for synchronous data (Isochronous-IN) or a request for asynchronous data (Bulk-IN) is performed according to the value of the link type field 430 in "the R event packet".

When the bluetooth module receives a request for USB data from the bluetooth host, the bluetooth module transfers the data received from the outside to the bluetooth host through the USB (step 340) and the bluetooth host replies with an "ACK" with respect to the received data (step 350). In the case of a request for asynchronous data, the length of data that can be transferred at one time through the USB is restricted to 64 bytes at most. Therefore, the steps 330 through 350 can be repeated for an appropriate number of times with reference to the value of the data length field 440 in "the R event packet".

The received data processing method in the bluetooth wireless communication device according to the embodiment of the present invention has been described. The above description needs to be re-constructed according to the temporal order. FIG. 5 is a flowchart for illustrating the received data processing method according to the temporal order in the bluetooth wireless communication device according to the present invention.

The bluetooth module receives data from the outside through the wireless link (step 510).

When the request for the USB interrupt is transferred from the bluetooth host to the bluetooth module in a state that the received data exists in the bluetooth module through the step 510 (step 520), the bluetooth module transfers "the R event packet" shown in FIG. 4 to the bluetooth host in response to the request for the USB interrupt (step 530).

When "the R event packet" is received in the step 530, the bluetooth host transfers the request for the USB data to the bluetooth module (step 540) and the bluetooth module transfers the received data to the bluetooth host through the USB (step 550). It was previously described that the type of request for the USB data can be appropriately designated in the step 540 and that the number of times the steps 540 and 550 are repeated can be determined with reference to "the R event packet".

The embodiments of the present invention can be realized by a program which can be executed by computer systems. Also, such a program can be executed by generally used digital computer systems by reading a corresponding program from computer readable recording media, in which such a program is recorded. Magnetic storage media such as ROMs, floppy disks, and hard disks, optical reading media such as CD-ROMs, DVDs, and carrier waves such as transmission through the Internet are included in the computer readable recording media.

According to the present invention, the bluetooth host generates the request for data through the USB only when received data exists in the bluetooth module. Therefore, it is possible to reduce the amount of overhead due to unnecessary requests for data.

By doing so, it is possible to minimize the load of the bluetooth host and to improve data receipt bandwidth in the bluetooth HCI USB transport layer. Also, it is possible to generate the request for data at the point of time at which data is received. Therefore, it is possible to increase the entire USB transmission speed.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A method for processing data received through a wireless channel, in that supports bluetooth wireless communication, comprising the steps of:

(a) a bluetooth module receiving data through a wireless channel;

(b) the bluetooth module informing a bluetooth host; through a universal serial bus (USB), that received data exists in the bluetooth module; and (c) the bluetooth host reading the data received by the bluetooth module in the step (a) through the USB when the bluetooth host is informed that received data exists in the step (b).

2. The method of claim 1, wherein, in the step (b), the bluetooth module informs the bluetooth host that the received data exists in the bluetooth module when the bluetooth module receives from the bluetooth host a request for checking whether the received data exists in the bluetooth module, in response to the request for checking whether the received data exists.

3. The method of claim 2, wherein, in the step (b), the request for checking whether the received data exists is performed using a request for interrupt, which is periodically transferred by the bluetooth host to the bluetooth module through the USB, and the informing is performed using an event packet.

4. The method of claim 3, wherein the step (c) comprises the steps of:

(c1) the bluetooth host making a request to the bluetooth module through the USB that the data received in the step (a) be sent from the bluetooth module to the bluetooth host when the bluetooth host is informed that received data exists in the step (b) through the event packet; and (c2) the bluetooth module providing the data received in the step (a) to the bluetooth host through the USB when the bluetooth module receives the request for the received data in the step (c1).

5. The method of claim 4, wherein the event packet comprises a link type field as a parameter field, for indicating an asynchronous link or a synchronous link, and wherein, in the step (c1), a request for synchronous or asynchronous data is performed according to the value of the link type field in the event packet.

6. The method of claim 4, wherein the event packet comprises a data length field as a parameter field, for indicating the length of the data received in the step (a), and wherein, in the step (c), the request for the received data in the step (c1) and the provision of the received data in the step (c2) are repeated an appropriate number of times, with reference to the value of the data length field in the event packet.

7. A method for processing data received through a wireless channel in a bluetooth module of a communication device that supports bluetooth wireless communication, comprising the steps of:

(a) receiving from a bluetooth host through a universal serial bus (USB) a request for checking whether received data exists in a bluetooth module;

(b) the bluetooth module informing the bluetooth host through the USB that received data exists when data received from the outside through a wireless channel exists in the bluetooth module;

(c) receiving from the bluetooth host, which is informed in the step (b) that the received data exists, through the USB, a request for the received data; and (d) the bluetooth module, after receiving the request for received data, providing the data received from the outside through the wireless channel to the bluetooth host through the USB.

8. The method of claim 7, wherein the request for checking whether received data exists, which is received in the step (a), is performed using a request for interrupt which is periodically transferred by the bluetooth host to the bluetooth module through the USB, and wherein the informing in the step (b) is performed using an event packet.

9. The method of claim 8, wherein the event packet comprises a link type field as a parameter field for indicating an asynchronous link or a synchronous link, and wherein a request for synchronous or asynchronous data according to the value of the link type field in the event packet is received from the bluetooth host in the step (c).

10. The method of claim 8, wherein the event packet comprises a data length field as a parameter field for indicating the length of the received data, wherein data of a limited length is provided to the bluetooth host in the step (d), and wherein the steps (c) and (d) are repeated an appropriate number of times according to the value of the data length field in the event packet.

11. A computer readable recording medium for recording a program which is executed in a computer for processing received data, in a bluetooth module of a communication device that supports bluetooth wireless communication, wherein the program comprises the steps of:

(a) receiving a request from a bluetooth host through a universal serial bus (USB), for checking whether received data exists in a bluetooth module;

(b) informing the bluetooth host through the USB that received data exists when data received from the outside through a wireless channel exists in the bluetooth module;

(c) receiving from the bluetooth host, which is informed that the received data exists in the step (b) through the USB a request for the received data; and (d) transferring the data received from the outside through the wireless channel to the bluetooth host through the USB.

12. A method for processing data received through a wireless channel, in a bluetooth host of a communication device that supports bluetooth wireless communication, comprising the steps of:

(a) a bluetooth host transferring a request to a bluetooth module through a universal serial bus (USB), for checking whether data received from the outside through a wireless channel exists;

(b) being informed by the bluetooth module through the USB that data received through the wireless channel exists when data received from the outside through the wireless channel exists in the bluetooth module;

(c) making a request to the bluetooth module through the USB that the received data be sent from the bluetooth module to the bluetooth host, when the bluetooth host is informed that received data exists in the step (b); and (d) receiving from the bluetooth module through the USB, the data received by the bluetooth module from the outside through the wireless channel.

13. The method of claim 12, wherein the request for checking whether the received data exists, which is transferred in the step (a), is performed using a request for interrupt which is periodically transferred by the bluetooth host to the bluetooth module through the USB, and wherein the informing in the step (b) is performed by an event packet.

14. The method of claim 13, wherein the event packet comprises a link type field as a parameter field for indicating an asynchronous link or a synchronous link, wherein a request for synchronous or asynchronous data to the bluetooth module is performed according to the value of the link type field in the event packet in the step (c).

15. The method of claim 13, wherein the event packet comprises a data length field as a parameter field; for indicating the length of the data received from the outside through the wireless channel, wherein data of a limited length is received in the step (d), and wherein the steps (c) and (d) are repeated an appropriate number of times according to the value of the data length field in the event packet.

16. A computer readable recording medium for recording a program which is executed in a computer for processing received data, in a bluetooth host of a communication device that supports a bluetooth wireless communication, wherein the program comprises the steps of:

(a) transferring a request to a bluetooth module through a universal serial bus (USB), for checking whether data received from the outside through a wireless channel exists in a bluetooth module;

(b) being informed from the bluetooth module through the USB that data received through the wireless channel exists when data received from the outside through the wireless channel exists in the bluetooth module;

(c) making a request to the bluetooth module through the USB that the received data be sent from the bluetooth module to the bluetooth host, when the bluetooth host is informed that the received data exists in the step (b); and (d) receiving from the bluetooth module through the USB, the data received by the bluetooth module from the outside through the wireless channel.

17. A communication apparatus for supporting bluetooth wireless communication, comprising:

a bluetooth module for transferring and receiving data through a wireless channel;

a bluetooth host for transferring data received from an application to the bluetooth module, reading data received in the bluetooth module, and transferring the received data to the application; and a universal serial bus (USB) for connecting the bluetooth module and the bluetooth host, wherein the bluetooth module informs the bluetooth host through the USB that received data exist, when data received through the wireless channel exists in the bluetooth module, and wherein the bluetooth host reads through the USB the data received in the bluetooth module when the bluetooth host is informed by the bluetooth module that the received data exists.

18. The apparatus of claim 17, wherein the bluetooth module informs that received data exists in the bluetooth module using an event packet in response to a request for interrupt which is periodically transferred by the bluetooth host to the bluetooth module through the USB, when the data received through the wireless channel exists in the bluetooth module.

19. The apparatus of claim 18, wherein the event packet comprises a link type field as a parameter field for indicating an asynchronous link or a synchronous link and a data length field as a parameter field for indicating the length of the data received from the outside through the wireless channel.

* * * * *